United States Patent

[11] 3,544,041

| [72] | Inventors | Wilfred J. Billerbeck, Jr.<br>Silver Spring;<br>James R. Owens, Garrett Park, Maryland |
|---|---|---|
| [21] | Appl. No. | 681,127 |
| [22] | Filed | Nov. 7, 1967 |
| [45] | Patented | Dec. 1, 1970 |
| [73] | Assignee | Communications Satellite Corporation<br>a corporation of Washington, DC |

[54] DEPLOYABLE FLEXIBLE SOLAR ARRAY
8 Claims, 4 Drawing Figs.

| [52] | U.S. Cl. | 244/1 |
|---|---|---|
| [51] | Int. Cl. | B64g 1/10 |
| [50] | Field of Search | 244/1 |

[56] References Cited
UNITED STATES PATENTS

| 3,326,497 | 6/1967 | Michelson | 244/1 |
|---|---|---|---|
| 3,423,755 | 1/1969 | Lassen et al. | 244/1 |

OTHER REFERENCES

Progress In Astronautics and Aeronautics Vol. 16 pages 983 and 998 Academic Press New York

*Primary Examiner*—Fergus S. Middleton
*Attorney*—Sughrue, Rothwell, Mion, Zinn & MacPeak

ABSTRACT: A deployable solar array for a spin-oriented and stabilized spacecraft comprising a plurality of flexible solar cell panels, each panel having one end thereof rigidly coupled to the sidewall of the spacecraft along a line parallel to the spin axis with the panels initially wrapped about the periphery of the spacecraft and means for releasing and guiding the panels, whereby centrifugal force, acting on the free end of the panels, causes them to be deployed under tension radially of the rotating spacecraft.

Patented Dec. 1, 1970

INVENTORS.
WILFRED J. BILLERBECK, Jr.
JAMES R. OWENS

BY
ATTORNEYS.

INVENTORS
WILFRED J. BILLERBECK, Jr.
JAMES R. OWENS

BY *Sughrue, Rothwell, Mion, Zinn & Macpeak*
ATTORNEYS

DEPLOYABLE FLEXIBLE SOLAR ARRAY

BACKGROUND OF THE INVENTION

1. Field of the Invention

The present invention has application to spin-oriented and stabilized spacecraft, and more particularly to such spacecraft useful in communication systems in which large power requirements are furnished by self-carried solar energy conversion means.

2. Description of the Prior Art

Spacecraft, especially those utilized in communication systems, normally carry power plants for supplying the electrical power to various control subsystems, such as that used for attitude control, and to the overall communication system system. Such spacecraft have long employed solar cells in various types of arrays for converting directly solar energy into electrical form. Obviously, the outer surfaces of the spacecraft may readily be covered with solar cells in a rigid manner, but the power converted is then limited by the area of the spacecraft outer surfaces. To increase the available power without materially increasing the size of the spacecraft itself, there have been attempts to deploy various rigid arrays of solar cells from the main spacecraft body subsequent to orbit and attitude orientation, such that the surface area of the solar cell array, when deployed, is much greater than the surface area of the spacecraft during launch.

Rigid type solar cell arrays, even when deployed from the spacecraft proper subsequent to achievement of orbit and attitude orientation, are still fragile and subject to damage, require power for deployment, require expensive and somewhat complicated bus connection employing stationary and moving elements, and more importantly, present to the spacecraft both static and dynamic balance problems when in deployed position.

Summary of the Invention

The present invention is directed to a simplified, low cost, dynamically stable, deployable, flexible solar cell array for a spin stabilized spacecraft. A plurality of flexible solar cell panels, each having one edge rigidly coupled to the sidewall of the spacecraft along a line parallel to the spin axis are wrapped about the sidewall during launch and are then deployed radially of the spacecraft as a result of centrifugal force exerted on the panels due to spin orientation of the spacecraft.

Preferably, each panel includes rodlike members coupled to its free end of sufficient mass to ensure deployment under centrifugal force at low spin rates and maintenance of the panels in the radially oriented position under light tension without wrinkling. Freely rotatable spiders may be carried by the spacecraft at the axial ends of the spacecraft, the spiders having arms equal in number to the flexible solar cell panels. The ends of these arms project radially beyond the sidewall of the spacecraft and carry guide means which extend parallel to the spacecraft axis, spaced slightly from the spacecraft sidewall, which contact the side of respective panels for wrapping of the panels about the periphery of the spacecraft, while allowing uniform unrolling of the flexible panels during deployment. The spiders are maintained latched after panel wrapping and may be selectively released to allow deployment of the panels by centrifugal force. The spiders may also be provided with braking means to ensure slow deployment of the flexible panels without distortion and achievement finally of the desired radial panel orientation.

A Brief Description of the Drawings

Description of the Preferred Embodiment

Figure 3:
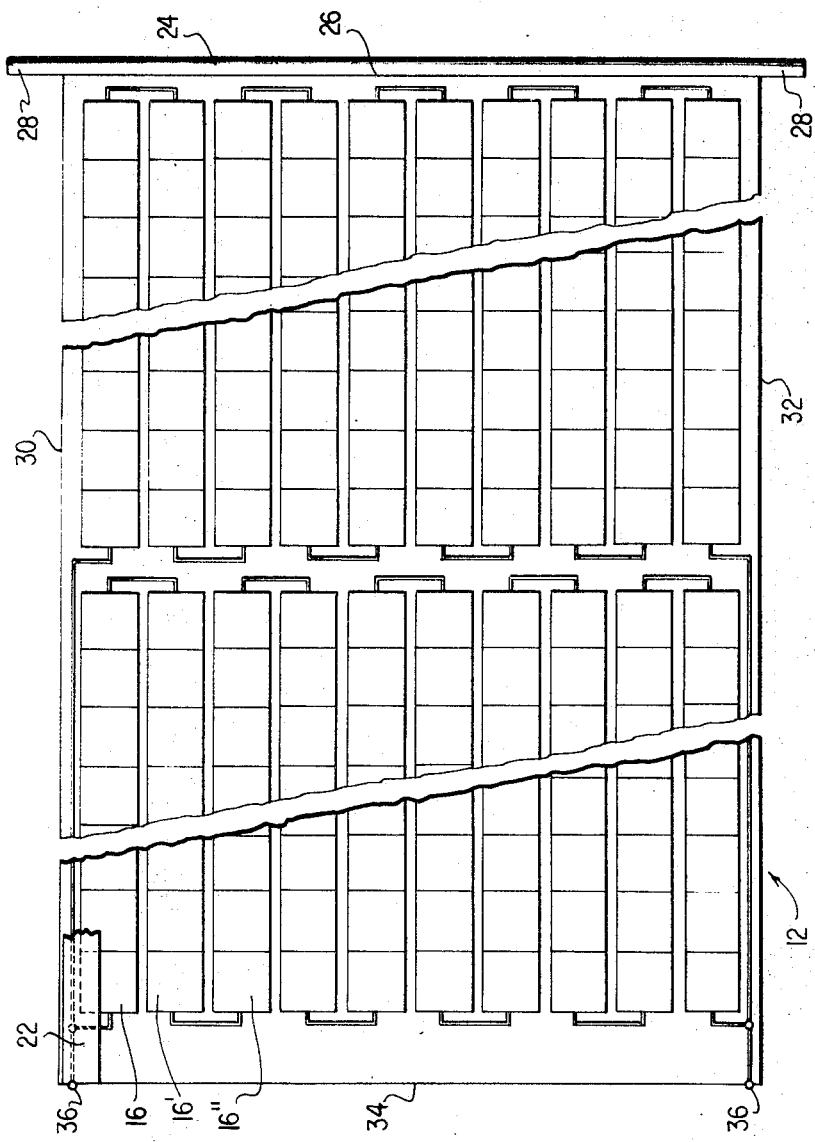
FIG. 3 is a plan view of one of the flexible solar array panels employed with the spacecraft shown in FIG. 1, prior to attachment thereto.
Figure 4:
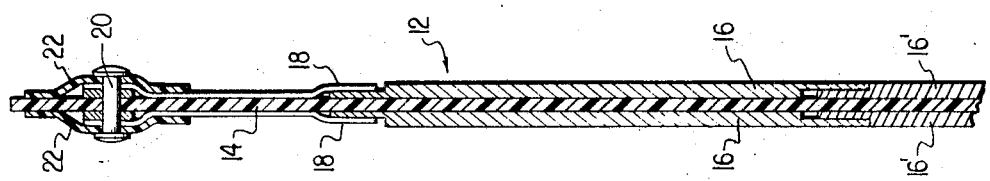
FIG. 4 is an end view of a portion of the panels shown in FIG. 3.

The deployable solar array of the present invention, as applied to a spin-oriented, preferably cylindrical spacecraft, indicated generally at 10, makes use of a plurality of flexible panels forming a solar cell array, the panels being indicated generally at 12, 12' and 12". Referring first to FIGS. 3 and 4, it is noted that each flexible panel, for instance, panel 12, employs a flexible plastic film substrate 14. A plurality of thin film solar cells 16, 16' and 16", etc., which consist of P/N type junctions, are formed on a flexible plastic film substrate 14 by vapor deposition or similar techniques. The thin film solar cells in the preferred embodiment, are formed of polycrystalline cadmium sulfide to achieve very significant weight and cost advantages with resultant power-to-weight ratio improvement over prior art solar cell materials. However, the cadmium sulfide solar cell in thin film form, in itself, forms no part of the present invention. Such thin film solar cells are presently being manufactured by the Clevite Corporation. For use in the present invention and as applied to the flexible plastic film substrate 14, the cadmium sulfide is formed on the substrate in a 1-mil thick layer, preferably by vapor deposition which acts as the N-type semiconductor. This thin film layer is then dipped in a copper chloride solution to form a surface layer of cuprous sulfide, which is the P-type semiconductor. A conductive metal grid is then deposited on or bonded to the cuprous sulfide to form the positive terminal. Typically, a 1-mil transparent cover, not shown, is overlaid on top of the grid to provide physical protection and radiation shielding against low energy particles. Such a material may comprise which Kapton which is inherently yellow and should result in minimum degradation due to the solar ultraviolet radiation. A cross section of FIG. 4 shows the substrate 14 as consisting of 4-mil Mylar with the cadmium sulfide cells 16 and 16' being shown as applied to both sides of the Mylar substrate and having terminals overlapped and electrically connected. Flexible copper bus conductors 18 are bonded to the substrate 14 and to cells 16 and 16' with a silicone rubber or flexible epoxy adhesive. Redundant solar busses are used for high reliability, interconnected through the substrate 14 with multiple eyelets 20, for instance. Individual series strings are isolated with redundant diodes (not shown) in a conventional manner. The Kapton covers 22 are shown as covering the panel edges only to provide mechanical protection of the electrical busses. Multiple eyelets 20 interconnect the solar busses 18 on each side of the flexible solar cell array. The flexible array of the illustrated embodiment is designed to provide a nominal power output of about 1 kilowatt and includes three panels 12, 12' and 12". A typical cell layout for panel 12 is shown in FIG. 3 in which the panel 12 has eight parallel strings, only partially shown, each being made of 260 cells, such as 16, 16' and 16" in series. As indicated best in FIG. 4, the back side of the panel is covered with an identical cell layout. Further, in the embodiment shown, the initial configuration of the spacecraft 10 before deployment is a cylinder or drum, approximately 5 feet in diameter and 3 feet in height. The approximate weight of the spacecraft after apogee motor firing is in the order of 300 pounds. In the array shown, each cell occupies a surface of approximately 9.0 square inches. Thus, for a typical panel 12 of FIG. 3, the panel when deployed extends a distance of 63 feet and is oriented normal to the surface of the cylindrical spacecraft with the height of the panel being approximately the same as the spacecraft height, on the order of 3 feet. Each panel preferably includes an end mass 24 in the form of a small diameter rod which is mechanically fixed to the outer edge 26 of the panel. The rod 24 may be formed of any material but is of sufficient mass to ensure proper deployment under centrifugal force at relatively low spin velocity upon release, after the spacecraft has been properly positioned in the desired orbit. It is noted that the tip ends 28 of the end mass rod 24 extend beyond the upper and lower edges 30 and 32, respectively, of the flexible panel. At the opposite side of the panel, edge 34 is adapted to be mechanically fixed to the periphery of the spacecraft along a line parallel to the spin axis, with the terminals 36 being electrically coupled to circuit components carried internally of the spacecraft. It is obvious, therefore, in employing the flexible solar cell array, that, the inner edge of each panel may be rigidly fixed to the outer surface of the spacecraft, with no need for complex electrical connections involving fixed and movable members which seem inherent in the powered, deployable, rigid prior art solar cell arrays.

Figure 1:
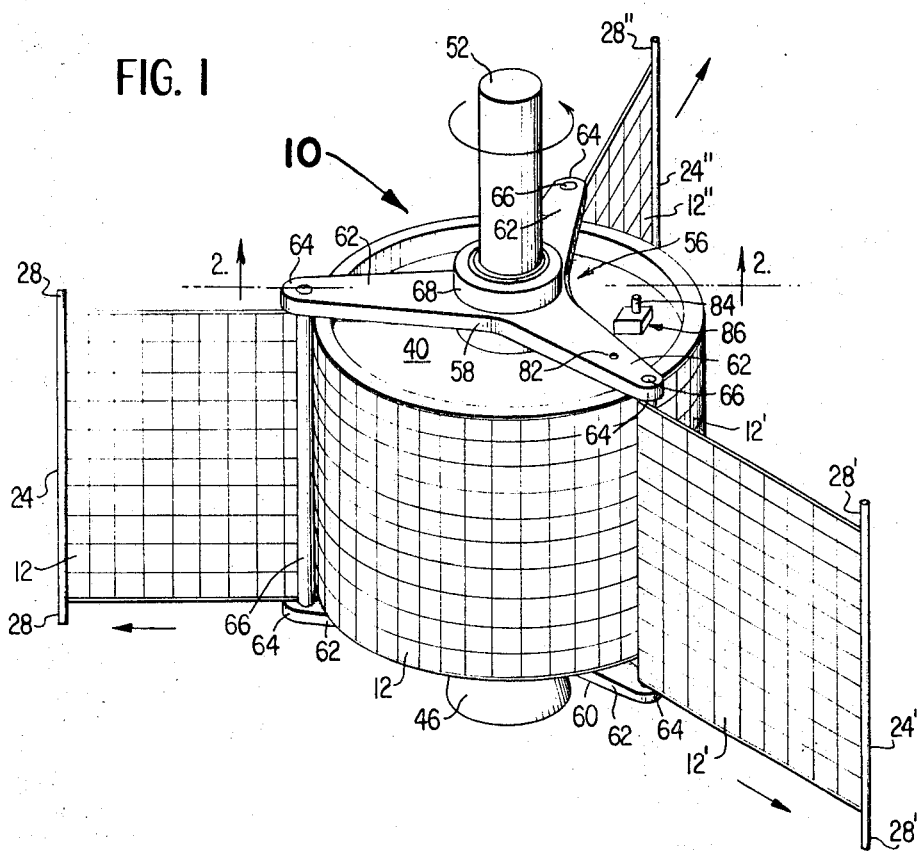
FIG. 1 is a perspective view of the deployable, flexible solar array for a spin-oriented cylindrical spacecraft with the flexible panels in the process of radial deployment after release of the spider assembly.

A thin film cadmium sulfide solar cell on the order of 9.0 square inches in area, at air mass 0° and 25°C., would conceivably a have a peak power output of 360 milliwatts with its weight approximating 1.57 grams and yielding 93 watts per pound taken by itself. Since deployable arrays for spacecraft use are typically weight limited rather than volume limited, the criterion for selection of a particular type of cell is watts per pound rather than energy conversion efficiency; this fact points up the ready applicability of a thin film solar cell to deployable arrays. For example, the three flexible panels, 12, 12' and 12", deployed in the manner shown in FIG. 1, would provide at peak power for each panel, normal incidence, one sun in space, at 25°C., approximately 7.63 amps at 104 volts or 765 watts. At the limiting solar aspect angles, the initial minimum instantaneous power for a solar array employing three such panels as shown in FIG. 1 would be 1,150 watts and the maximum as the spacecraft rotates would be in the order of 1,400 watts. Therefore, use of the deployment system of the present invention with three panels as shown with bus conductors of proper size to keep the $I^2R$ losses below 1 percent of the array output., the overall power-to-weight ratio would be greater than 15 watts per pound two to three times the power-to-weight ratio achieved with the rigid array prior art systems.

A principal aspect of the present invention is the deployment system illustrated in FIG. 1 used in conjunction with a thin film cadmium sulfide solar cell array in flexible panel form. As shown in FIG. 1, the spacecraft 10 is a essentially cylindrical in configuration in the form of a drum having a cylindrical outer wall 38, an upper end wall 40 and a lower end wall 42. The lower end wall 42 includes a rather large central opening 44 through which protrudes an outlet nozzle 46 of a solid propellant fuel propulsion motor, indicated generally at 48, carried internally of the drum. the upper end wall 40 is centrally apertured at 50 and receives one end of the fixed antenna 52 which may be keyed in place at 54. The inboard ends or edges of the three panels, 12, 12' and 12", are permanently attached to the spacecraft cylinder wall 38 with equidistant spacing about the periphery of the spacecraft. The solar bus connections (not shown) are made to the spacecraft along these lines of attachment which are parallel to the spin axis of the spacecraft 10.

To facilitate storing and deploying of the relatively long, flexible panels, a freely rotatable spider assembly 56 is carried by the spacecraft. The spider assembly includes upper and lower spiders 58 and 60, respectively, which, in this case, have a number of equally spaced, radially projecting arms 62 which are equal in number to the panels attached to the drum periphery, in this case three. It is noted that the tip ends 64 of the arms extend beyond the periphery of the drum and act to support guide members in the form of rollers 66 which extend between the upper and lower spiders 58 and 60 and are journaled therein for free rotation about the guide rod axis. The small diameter guide rollers 66, which are spaced slightly from the surface of the spacecraft side wall or drum 38, may alternatively be fixed within their mounting holes, if desired, to ensure proper wrapping of the flexible panel arrays 12, 12' and 12" about the periphery of the drum. The upper spider 58 is flanged at 68 and carries a minimum friction bearing 70 such that the spider is freely revolvable about the antenna 52 which acts as the axis of rotation for the spider. Likewise, the lower spider 60 is supported upon an annular collar 72 carried by the propellant motor nozzle 46 and is freely revolvable about the axis of the propellant motor 48 which is in axial alinement with antenna 52. The lower spider 60 is also provided with minimum friction bearing at 74 to ensure low friction rotation of the spider assembly 56.

Figure 2:
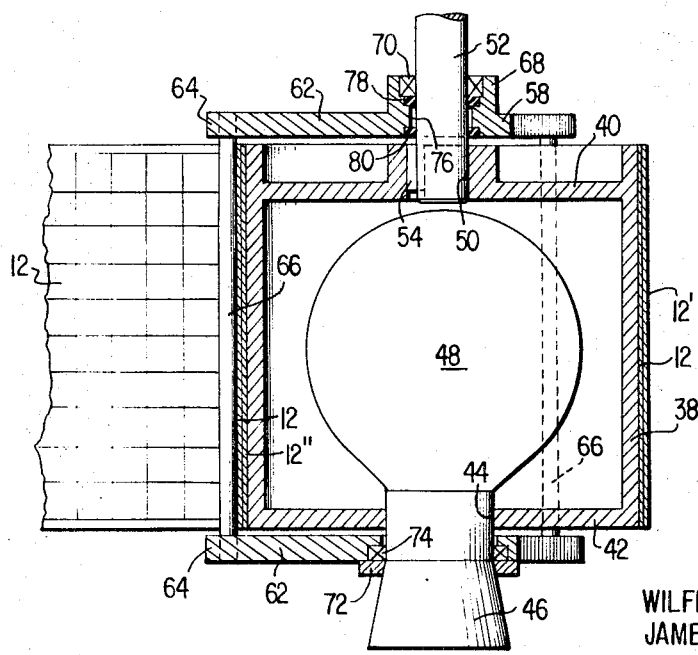
FIG. 2 is an elevational view, in section, of the spacecraft shown in FIG. 1 taken about lines 2—2.

The spider assembly 56 may further include braking means for frictionally restraining rotation of the spider assembly about the spin axis. For instance, an annular cavity 76 may be formed between the antifriction means 70 and the bottom surface of spider member 58. Appropriate seals, at 78 and 80, may be used to prevent a viscous fluid (not shown) carried by the cavity 76 from escaping at either end of antenna shaft 52. Thus, the viscous media carried by the cavity acts as a frictional restraint against relative movement between the spider assembly 56 and antenna 52 which forms a part of the spacecraft. Obviously, other means may be employed for governing the rotative speed of the spider assembly relative to the spacecraft body during panel deployment, such as a mechanical brake, an eddy current brake or the like. It is essential that the spider have low static friction so that the mass of the flexible panels including the end mass rods are sufficient, with the spider release, to cause rotation of the spider relative to the drum and unwinding of the flexible panels from the periphery of the drum itself and movement into circumferentially spaced, radial positions. The flexible panel arrays 12, 12' and 12" are stowed by holding the spacecraft fixed and rotating the spider assembly 56 clockwise in a direction opposite to the arrow shown in FIG. 1. This causes the guide rollers 66 to contact the sides of the panels 12, 12' and 12" and the panels to wrap themselves in spiral fashion, one on top of the other, about the periphery of the drum. Since the panels in the present embodiment are approximately 70 feet in length, there is provided a multiple layer wrap, as may be best seen in FIG. 2. As the panels are wrapped about the drum periphery, the end mass rods 24, 24' and 24" move toward the guide members 66 until the projecting ends 28, 28' and 28" contact the left-hand edges of the spider arms 62 (FIG. 1). The end mass rods are maintained in position, parallel to and adjacent the guide rods 66. The spider assembly is so oriented with respect to the attached flexible panels that when the end mass rods abut their respective spider assembly arms, an axial opening 82 formed within one of the arms 62 of the upper spider 58 overlies a detent pin or latch 84 carried by a detent latch mechanism 86 which is fixed to the outside of the upper drum end wall 40. The detent mechanism is preferably of the redundant type with pin 84 moved outwardly from the position shown in FIG. 1, such that it is received within opening 82. The redundant squib deployment latch may take the form of an explosive bolt or the latch may consist of a solenoid-operated axially movable pin. This maintains the spider assembly in proper position after wrapping of the flexible panels about the periphery of the drum during spacecraft launch, but allows the freely revolvable spider assembly to rotate about the spacecraft spin axis when the detent pin is selectively retracted to the position shown in FIG. 1. When solar array deployment is required, after orbit, the spacecraft 10 is first spun up to about 120 r.p.m. by a booster (not shown). The deployment sequence is initiated when a command causes retraction of the redundant squib deployment latch or pin 84. This allows centrifugal force to act on the end masses, in this case rods 24, 24' and 24" to effect motion of the spider assembly relative to the spacecraft. Slow unreeling of the three flexible panels 12, 12' and 12" occurs simultaneously under control of the viscous fluid carried within cavity 76. Since payout speed is low, each solar cell array panel moves out in a nearly radial direction, well separated from the other panels. The use of a single mechanism in the form of the spider assembly to control unreeling of the flexible panel avoids the possibility of dynamic unbalance by ensuring uniform deployment of the three panels. At the end of the deployment sequence, the spin speed will be approximately 1 r.p.m. The end masses or panel tip weights must be payed out slowly in steps to keep the coriolis and inertia forces at a low level and to allow perturbations to damp out. The cylinder will be spinning about its axis of symmetry and the moment of inertia about the cylindrical axis must be greater than those about either of the transverse axes for reasons of stability. Any bending of the arrays will dissipate energy and the overall vehicle should seek its stable mode, that is, one in which the panels are fully extended. From undeployed to fully deployed configuration, the moment of inertia will increase by approximately a factor of 100, thus the spin rate will decrease in a like manner. The final spin rate will be between 1 and 2 r.p.m. depending upon the initial spin rate. The deployed panel arrays should serve as natural dampers. Subsequent to deployment, it may be necessary to employ both radial and axial thrusters for orientation attitude control and station keeping. The level of allowable thrust is limited such that the thrusting does not cause the tension in the deployed arrays to become negative and thus collapse them. Once deployed, a relatively low spin velocity is sufficient to maintain the panels in tension.

The preceding discussion shows that an array of cadmium sulfide solar cells on a flexible substrate deployed in the manner indicated is both a feasible and attractive concept for relatively large kilowatt power systems. This system also exhibits maximum compatibility with available small launch vehicles. Using the deployment system of the present invention, the resultant power-to-weight ratio of 15 watts per pound compares quite favorably with the 4 to 5 watt per pound ratio for a drum-covered silicon array. Further, installation cost is considerably reduced, since the present system employs a small number of connections per watt and flexible solar cells are readily available and adaptable to high rate production techniques. A power plant employing deployable solar cell panels as described above is quite compatible with existing attitude control and station keeping techniques.

We claim:

1. A deployable solar array for a spin-oriented spacecraft comprising: a plurality of flexible solar cell panels, each having one end rigidly coupled to the sidewall of the spacecraft along a line parallel to the spin axis, means forming end masses along the free end of each panel, a spider assembly carried by said spacecraft and mounted for free rotation about said spacecraft axis, said spider assembly including arms equal in number to the flexible panels, said arms being uniformly spaced and having ends extending beyond the spacecraft body, guide means carried by each arm and lying adjacent the spacecraft wall parallel to its spin axis and in contact with said flexible panels, and end latching means for initially maintaining said panels wrapped about the periphery of said spacecraft wall and for subsequently releasing the free end of said panels whereby centrifugal force, acting on said end masses, causes uniform, simultaneous deployment of said flexible panels under tension radially of said spacecraft through rotation of said spider assembly.

2. The solar array as claimed in claim 1 wherein said end mass for each flexible panel comprises a thin rod attached to the free end thereof along the free panel edge.

3. The solar array as claimed in claim 2 wherein each rod includes tips extending beyond the edges of the panel, whereby during winding of the spider, the tips contact the ends of the spider assembly to prevent further winding of said panel.

4. The solar array as claimed in claim 1 wherein said end-latching means includes means for mechanically latching said spider assembly in panel windup position and means for selectively releasing said latching means to achieve centrifugal panel deployment as said spacecraft rotates about its spin axis.

5. The solar array as claimed in claim 4 wherein said mechanical latching means comprises a detent pin carried by said spacecraft in the path of said rotating spider assembly, a pin receiving opening carried by said spider assembly and means for selectively removing said pin from said opening, whereby said panel end masses under centrifugal force move said flexible panels radially outward to unroll the flexible panel and rotate the spider assembly relative to said spacecraft.

6. The solar array as claimed in claim 5 further including spider assembly rotation braking means to ensure uniform radial deployment of said flexible panels at equally spaced circumferential positions.

7. A deployable solar array for a spin-oriented spacecraft comprising:
a plurality of flexible solar cell panels adapted to be initially wrapped about the sidewalls of the spacecraft, said panels having a free end and a fixed end, said fixed end being rigidly coupled to the sidewall of the spacecraft along a line parallel to the spin axis;
means forming end masses along said free end of each panel;
a single deployment means mounted on said spacecraft and including a plurality of guide members in contact with said flexible panels, said deployment means being rotatable about said spacecraft for controlling the uniform simultaneous deployment of said plurality of flexible panels;
means for releasably securing said free ends of the wrapped panels until deployment; and
whereby upon release of said free ends, centrifugal force acting on said end masses causes said flexible panels to be radially deployed under control of said deployment means.

8. The solar array recited in claim 7 wherein said single deployment means includes a rotation-damping means for controlling the rate of simultaneous deployment of said flexible panels.